Nov. 24, 1953   G. W. HOPKINS ET AL   2,660,374
KEY-SET-KEY-RESPONSIVE CALCULATING MACHINE
Filed July 30, 1948   6 Sheets-Sheet 1
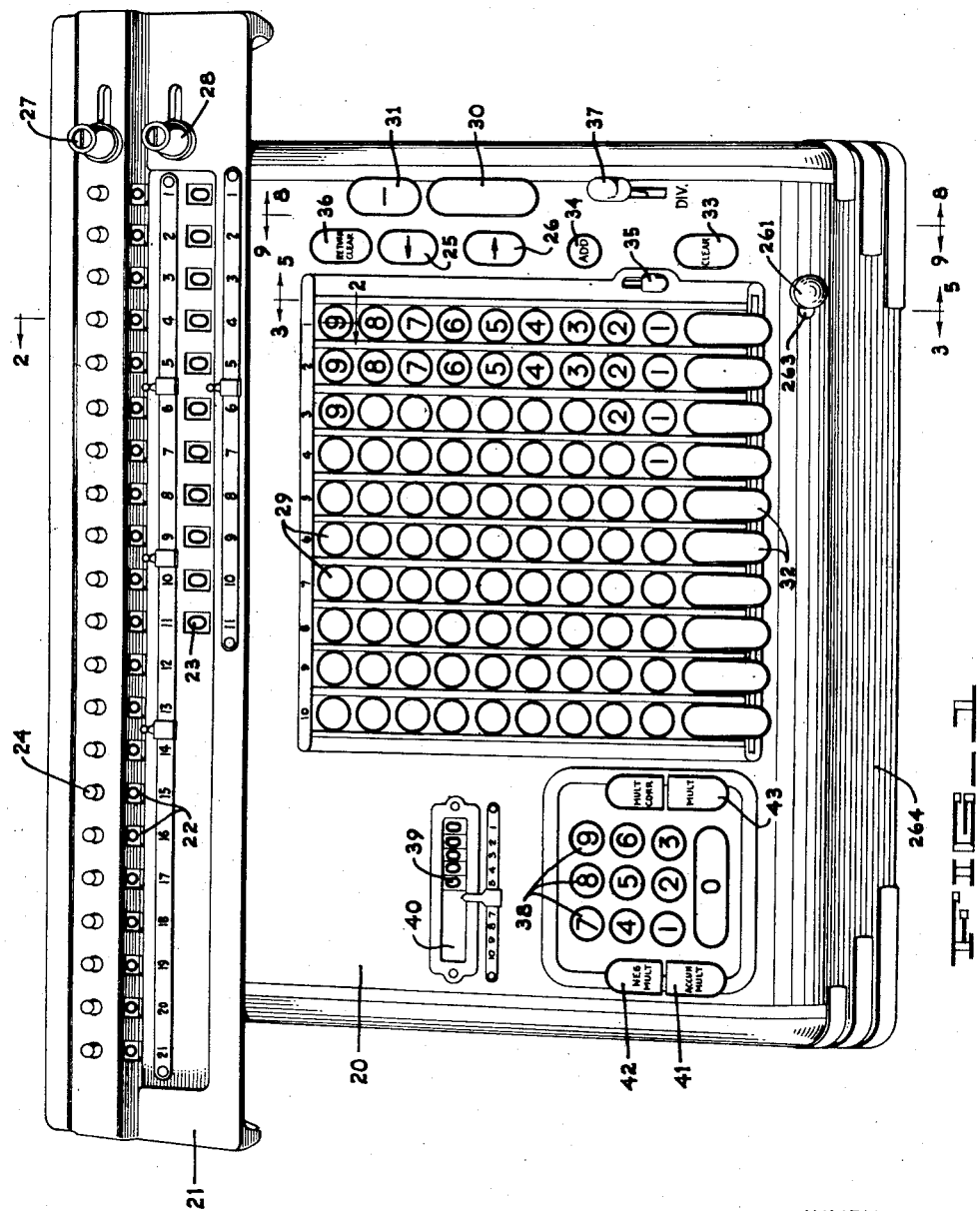
INVENTORS
GEORGE W. HOPKINS
DONALD L. ROLPH
BY

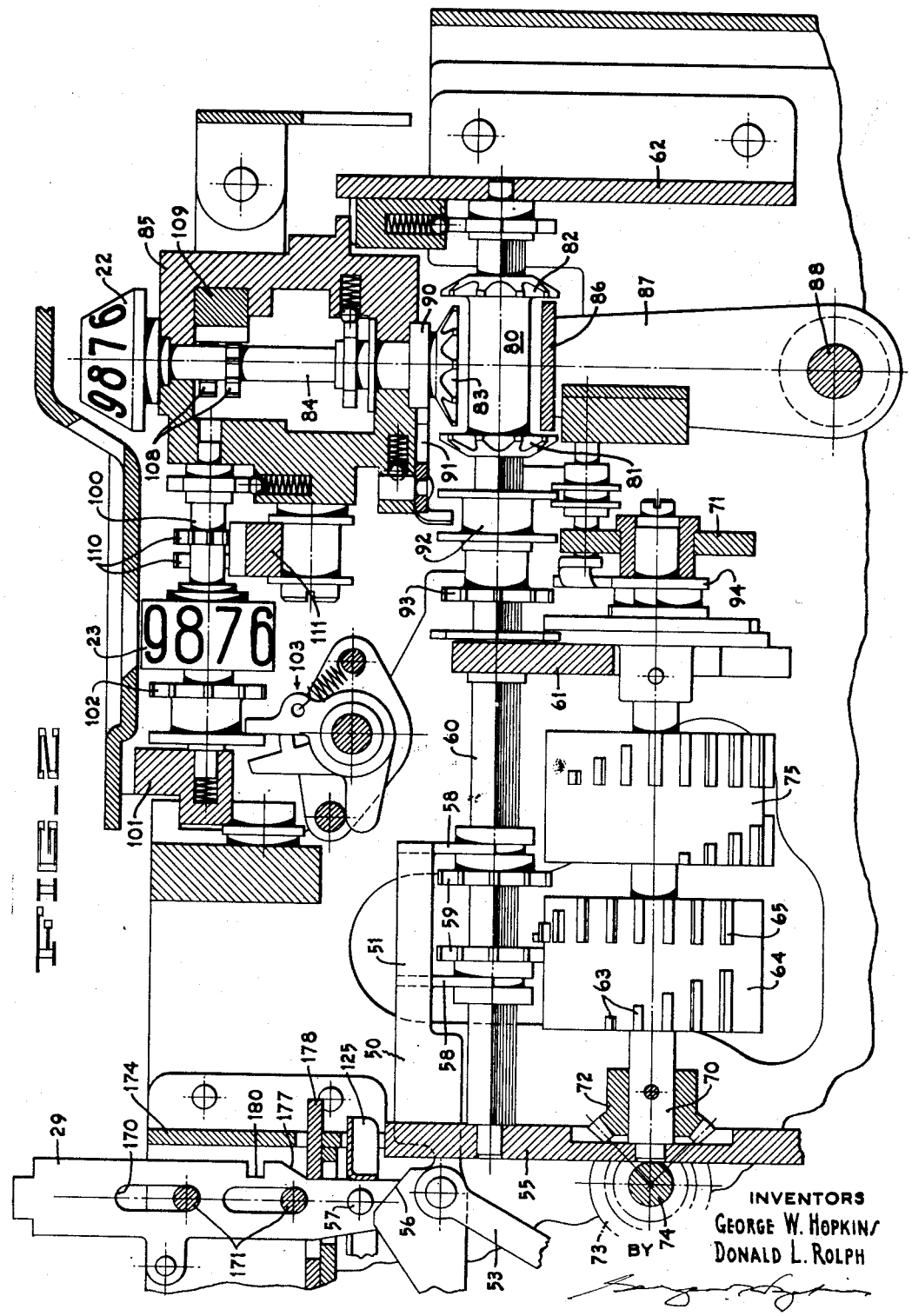

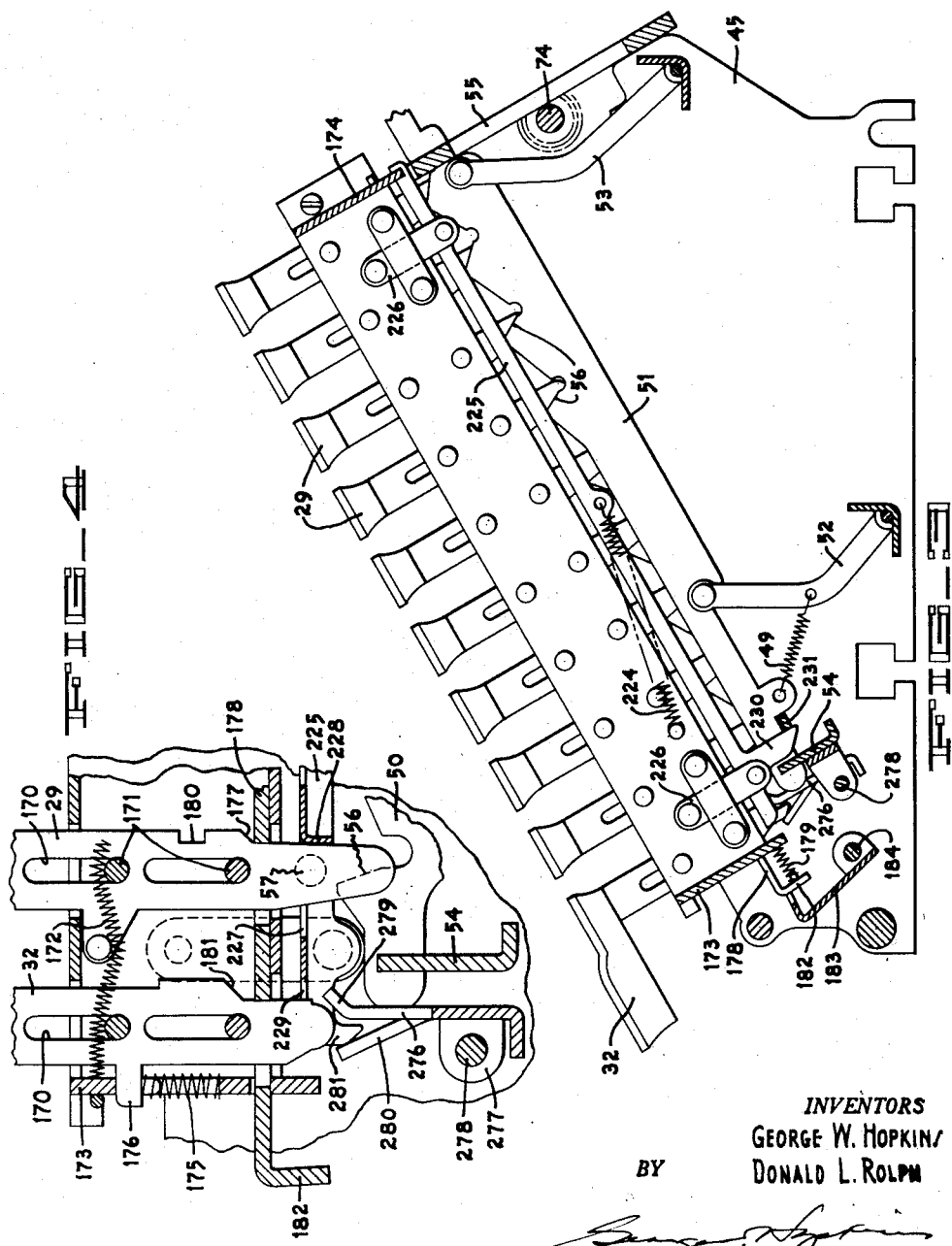

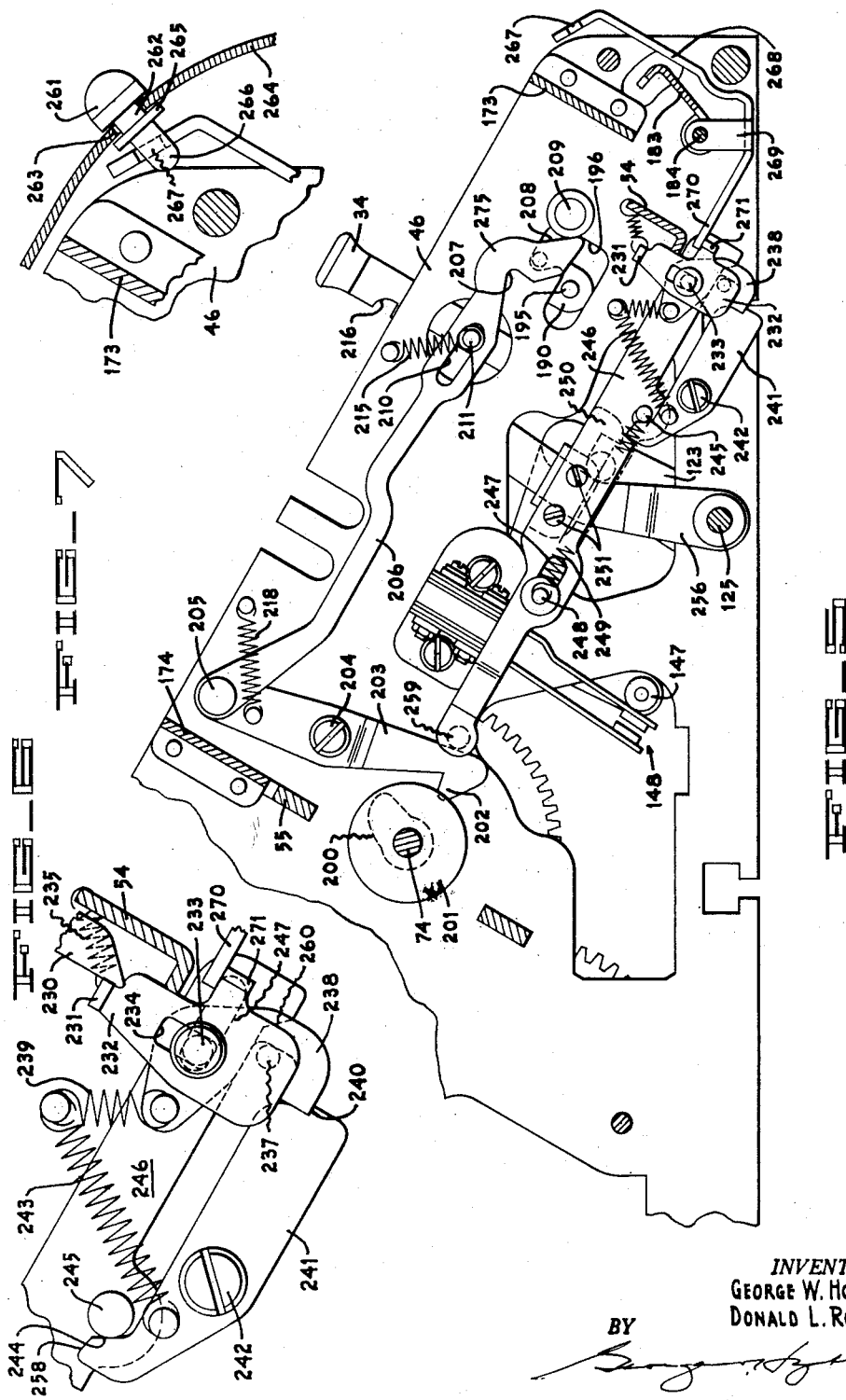

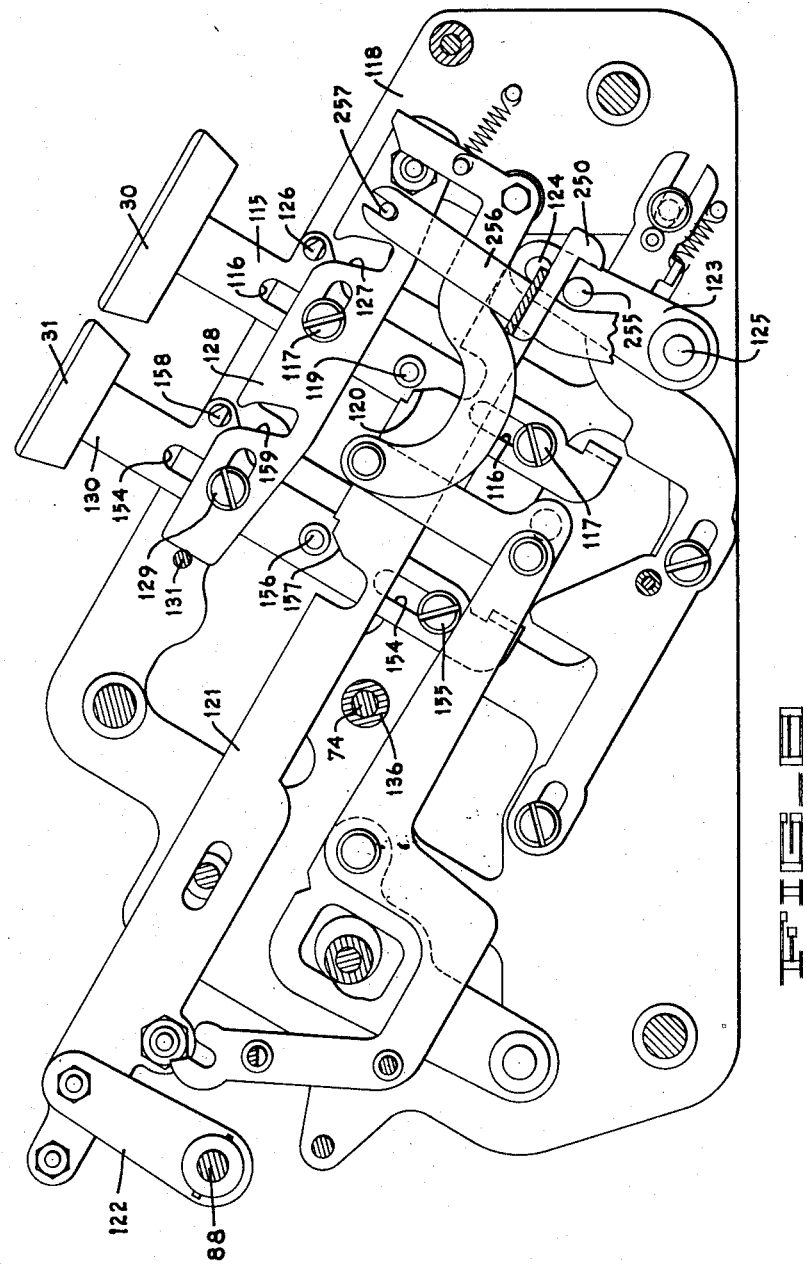

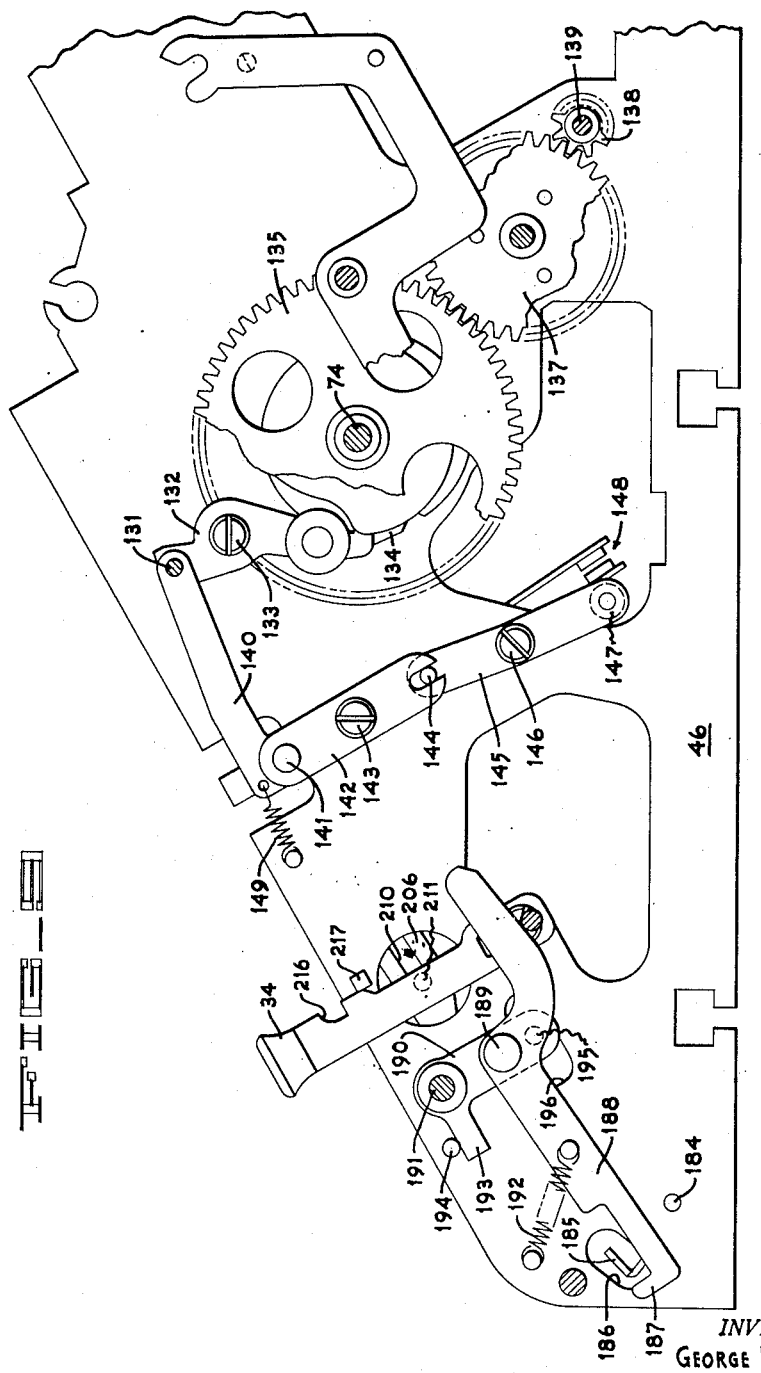

Patented Nov. 24, 1953

2,660,374

UNITED STATES PATENT OFFICE 2,660,374

KEY-SET-KEY-RESPONSIVE CALCULATING MACHINE

George W. Hopkins and Donald L. Rolph, San Leandro, Calif., assignors to Friden Calculating Machine Co., Inc., a corporation of California Application July 30, 1948, Serial No. 41,526

20 Claims. (Cl. 235—62)

This invention relates to the registration control and cycle initiating mechanism of a calculating machine and more particularly to a "live" keyboard or key-responsive type of machine in which the above-mentioned mechanism is placed under the control of the amount keys so as to cause a registering operation to be initiated when an amount key is depressed.

The present invention is shown as applied to a calculating machine of the type shown in U. S. Patent No. 2,229,889 issued January 28, 1941 to Carl M. F. Friden and reference may be had to this patent for a general understanding of the construction and mode of operation of the basic machine illustrated herein. It will be noted that the machine shown in Patent No. 2,229,889 is a key-set type of calculator in which the amount to be registered is first set-up on the keyboard after which the plus bar, minus bar, or other control key is depressed in order to initiate operation of the actuating mechanism of the machine. When performing certain types of calculations, however, for example, when adding up a long list of figures, it may be found desirable to dispense with the necessity of depressing the plus bar in order to initiate cycling of the machine and to place this function under the control of the amount keys. In other words, it may facilitate the work of the operator if the machine is capable of being converted into a key-responsive type of calculator in which the depression of an amount key serves not only to set a value into the machine but also serves to initiate an amount registering operation.

Accordingly, it is an object of the present invention to provide a calculating machine which can be rendered either key-set or key-responsive at the option of the operator.

It is another object of the invention to provide a calculating machine which can be selectively converted from a conventional multi-cyclic, key-set type of calculator into a unicyclic, key-responsive type of machine in which additive registration operations are placed under the control of the amount keyboard.

It is a further object of the invention to provide a calculating machine in which the means for initiating a registration operation may be placed under the control of the units order keys of the amount keyboard. In this way the operator can set-up a figure on the keyboard beginning with the highest order digit first and then proceeding through to the units order digit whereupon the machine cycle will be initiated and the amount entered into the accumulator. Thus the need for depressing the plus bar after the amount has been set up on the keyboard is eliminated.

Still a further object of the invention resides in the provision of means for rendering the ordinal clear keys "live" as well as the units order keys so that when an amount ending in one or more zeros is set up on the keyboard, the depression of any one of the ordinal clear keys will cause an adding operation to take place.

Another object of the invention resides in the provision of means for limiting the operation of the machine to a sigle cycle when it is conditioned for key-responsive operation.

Still another object of the invention is to provide means for automatically causing the amount keys to be released at the end of each cycle when the machine is conditioned for key-responsive operation.

It is a further object of the invention to provide a key-responsive calculator in which the depression of a "live" key on the amount keyboard causes the add-subtract registration control mechanism and the cycle initiating means to be operated in a predetermined sequence.

Various other objects will become apparent from the following description of a preferred embodiment of the invention, as illustrated in the accompanying drawings, in which:

Fig. 1 is a plan view of the complete machine showing the general arrangement of the amount keys, multiplier keys, the various operation control keys, and the shiftable numeral wheel carriage.

Fig. 2 is a longitudinal sectional elevation showing the actuating mechanism and the numeral wheel carriage of the machine. This section is taken along the lines 2—2 in Fig. 1.

Fig. 3 is a longitudinal sectional elevation taken along the line 3—3 in Fig. 1 and shows the units order blank of amount keys together with certain of the novel mechanism forming a part of this invention.

Fig. 4 is a fragmentary elevation showing in greater detail a portion of the mechanism illustrated in Fig. 3.

Fig. 5 is a longitudinal sectional elevation showing the novel mechanism employed for setting both the add-subtract gate and also the mechanism for initiating a cycle of operation of the machine. This section is taken along the line 5—5 in Fig. 1.

Fig. 6 is a fragmentary view showing in greater detail the latch mechanism which normally restrains the auxiliary power actuator against operation.

Fig. 7 is a fragmentary view showing the key-set-key-responsive control slide.

Fig. 8 is a longitudinal sectional elevation showing the manner in which the gate setting slide and the cycle initiating slide are sequentially operated by the auxiliary power actuator. This view is taken along the line 8—8 in Fig. 1.

Fig. 9 is a longitudinal sectional elevation taken along the line 9—9 in Fig. 1 and showing additional details of the "Add" key and of the cycle initiating mechanism.

Reference is made to application Serial No. 698,314 filed by George W. Hopkins on September 20, 1946, now Patent 2,552,789, issued May 15, 1951, which contains claims to certain of the subject matter shown and described but not claimed herein.

*General description*

As previously stated, the present invention is shown incorporated in a machine of the type shown and described in U. S. Patent No. 2,229,889. It will become evident, however, from a study of the present disclosure, that the invention is not limited to use with machines of this type but may also be applied to other types of computing devices with equally desirable results.

In order to provide a clear understanding of the relationship of the present invention to the structure shown in the above-mentioned patent, a brief description will be given of certain of the mechanisms shown and described in the patent. Referring to Figs. 1 and 2 of the drawings, the machine is comprised of a main body portion 20 in which the actuating, selecting and control mechanisms are mounted, and a carriage 21 which is mounted for endwise shifting movement transversely of the body portion 20 and which carries numeral wheels 22 and 23 of the accumulator and revolutions counter respectively. The ends of the dial shafts upon which the accumulator wheels 22 are mounted are provided with twirler knobs 24 by means of which the dials may be manually set to any desired position from 0 to 9. The carriage 21 may be shifted in either direction by power derived from the electric driving motor of the machine by manipulation of the carriage shift keys 25 and 26. Clearance of the accumulator wheels 22 may be effected by manipulation of the resetting knob 27 while the revolutions counter wheels 23 may be reset to zero by manipulation of the knob 28.

Amounts to be entered into the accumulator wheels 22 may be set up on the amount keys 29, after which the amount may be entered positively or negatively into the accumulator wheels 22 by manipulation of the plus key 30 or the minus key 31. In case an erroneous setting is made on the amount keys 29, the incorrectly depressed key in any one of the individual key banks may be released by depression of the ordinal clear key 32 relating to that particular bank. If it is desired to release all of the depressed keys of the keyboard, this may be accomplished by depression of the clear key 33. Since it is ordinarily desirable in adding and subtracting operations to cause all depressed amount keys to be released at the end of each machine cycle, an "Add" key 34 is provided which may be depressed and latched down in order to cause the automatic release of all amount keys at the conclusion of each machine cycle. A keyboard lock lever 35 is also provided for locking all of the amount keys 29 in either their normal or depressed positions so as to preserve the value set therein for succeeding calculations to be performed on the machine.

The machine is also provided with a return clear key 36 for causing the shiftable carriage to be traversed to its extreme left hand position after which the accumulator wheels 22, or revolutions counter wheels 23, or both, depending upon the angular setting of the knobs 27 and 28, will be reset to their "0" positions thereby preparing the machine for the next operation to follow. A complete disclosure of this mechanism will be found in Patent No. 2,294,083 issued to Carl M. Friden on August 25, 1942.

Dividing operations are performed on this machine by entering the dividend on the accumulator wheels 22, setting the divisor into the amount keys 29, and then pulling forward and releasing the division lever 37. This will cause an automatic division operation to take place in which the divisor is repeatedly subtracted from the dividend until an overdraft occurs in the accumulator wheels 22, after which the divisor is added back into the accumulator so as to eliminate the overdraft and the carriage shifted one order to the left. The divisor is again repeatedly subtracted from the dividend in this order until an overdraft occurs, whereupon the divisor is added back into the accumulator wheels, the carriage shifted, and so on, from order to order until a quotient containing the desired number of decimal places is obtained in the revolutions counter wheels 23. For a complete disclosure of the automatic division mechanism, see Patent No. 2,327,981 issued August 31, 1943, to Carl M. Friden.

To the left of the amount keyboard is provided a group of ten multiplier keys 38 by means of which the multiplier of any desired value may be set into the machine. As each key 38 is depressed, a number corresponding to the value of the key depressed is indicated on the multiplier indicator dials 39 which are visible through a window 40 provided in the casing of the machine. After a desired multiplier value has been set into the machine by means of the keys 38 and a multiplicand has been set up on the amount keyboard, an automatic multiplication operation may be initiated by depression of one of the keys 41, 42 or 43. The key 41 will cause an automatic multiplication operation to take place in which the multiplicand will be successively multiplied by each digit of the multiplier. However, prior to the initiation of the multiplication operation, the carriage will be automatically shifted to its extreme left-hand position after which the multiplication of the multiplicand by each digit of the multiplier will take place, the carriage shifting one place to the right after each multiplication of the multiplicand by a multiplier digit. This operation will continue automatically until the multiplicand has been successively multiplied by each digit of the multiplier after which the product will appear in the accumulator wheels 22 and the multiplier will now be indicated on the revolutions counter wheels 23. When the multiplication key 42 is depressed a similar type of operation will take place except that now the product will be registered negatively in the accumulator wheels 22 instead of positively as was the case when the multiplication operation was initiated by the key 41. If it is desired that the accumulator wheels 22 and/or the revolutions counter 23 be zeroized prior to the initiation of the automatic multiplication operation, the return and clear multiplication key 43 may be utilized. Upon depression of this key the carriage will be shifted to its extreme left hand position after which the accumulator wheels 22 and/or the revolutions counter wheels 23 will be reset to zero and an automatic multiplication operation will then take place as before.

Reference may be had to Patent No. 2,371,752 issued to Carl M. Friden on March 20, 1945, and Patent No. 2,399,917 issued to Carl M. Friden and Anthony B. Machado on May 7, 1946, for a complete disclosure of the automatic multiplication mechanism.

*Selecting and actuating mechanism*

The values to be introduced into the accumulator wheels 22 are determined by means of a selecting mechanism associated with each bank of numeral keys 29. As shown in Figs. 2 and 3, each bank of keys cooperates with a pair of parallel selecting bars 50 and 51 which are mounted for endwise movement by means of parallel supporting links 52 and 53 and are resiliently urged toward the rear of the machine by means of springs 49. The lateral spacing of the selector bars 50 and 51 is maintained by means of suitable slots provided in crossbars 54 and 55 which extend between the left and right side frames 45 and 46 (Figs. 3 and 9) of the machine. Each of the selector bars is provided with a series of inclined cam faces 56 which are adapted to be acted upon by pins 57 provided on the key stems of the amount keys 29. The selector bar 50 is provided with five such cam faces which cooperate with the 1–5 keys, while the bar 51 is provided with four cam faces 56 which cooperate with the 6–9 keys. Each of the selector bars is provided at its rear end with a bent-over forked extension 58 which embraces a groove provided in each of the hubs of a pair of selector gears 59. These gears are slidably mounted on a longitudinally disposed square shaft 60 journalled in the crossbars 55, 61 and 62 of the machine frame. The gear 59 which is controlled by the selector bar 50 for the 1–5 keys is adapted to cooperate with stepped teeth 63 provided on the periphery of an actuator drum 64 while the gear 59 controlled by the selector bar 51 for the 6–9 keys is adapted to cooperate with teeth 65 also provided on the drum 64. Thus, when the number "1" key is depressed, the gear 59 controlled by the bar 50 will be slid forward one step along the square shaft 60 so as to bring the gear into the path of travel of the longest gear tooth 63 thereby causing the shaft 60 to be given one increment of rotation. In a similar manner, depression of the "2," "3," "4" or "5" keys will cause the gear to be brought into the path of travel of successive teeth 63 so as to cause the shaft 60 to receive additional increments of movement. Depression of the "6" key will cause the gear 59 controlled by the bar 51 to be moved forward one step so as to bring this gear into cooperative relationship with the 6 teeth 65 of equal length, whereas depression of the "7," "8," and "9" keys will cause the gear to be moved into the path of travel of additional teeth 65 which are disposed in staggered relationship on the drum 64.

The actuator drum 64 is secured to an actuator shaft 70 which is journalled at its forward end in cross-bar 55 and at its rearward end in cross-bar 71 of the machine framework. This shaft is provided at its forward end with a bevel gear 72 which meshes with a corresponding bevel gear 73 secured on a cross-shaft 74 journalled in the machine side frames 45 and 46 and adapted to be given cycles of rotation by means of an electric motor which is provided for driving the operating mechanism of the machine. Also mounted on the actuator shaft 70 is a second actuator drum 75 which is provided with two sets of teeth corresponding to teeth 63 and 65 which are arranged to cooperate with the selector gears controlled by an adjacent order of amount keys.

Slidably and non-rotatably mounted on the rear end of the square shaft 60 is a spool 80 carrying an add gear 81 and a subtract gear 82. As shown in Fig. 2, these gears are normally located in a neutral position with respect to a gear 83 secured to the lower end of an accumulator wheel dial shaft 84 journalled in a hollow carriage frame bar 85. These gears 81 and 82 may be selectively engaged with the gear 83 by means of a strap or gate 86 extending transversely of the square shafts 60 and supported on either side of the machine by a pair of identical arms 87 secured to a shaft 88 journalled between the side frames 45 and 46. The shaft 88 and the gate 86 are normally held in the position shown in Fig. 2 by means of a conventional spring-biased centralizer so as to normally maintain the add-subtract gears 81 and 82 in their neutral position and thereby permit the carriage to be shifted from one ordinal position to another without interference on the part of the gears 81 and 82. However, by means later to be described, the shaft 88 may be rocked clockwise in order to engage the gear 81 with the gear 83 so as to cause an accumulator dial 22 secured to the upper end of the dial shaft 84 to be turned in a forward or positive direction, or the shaft 88 may be rotated counter-clockwise so as to cause the subtract gear 82 to mesh with the gear 83 and thereby cause the dial 22 to be rotated in the reverse or negative direction.

Secured to the dial shaft 84, immediately above the gear 83, is a tens-transfer cam 90 which is arranged to cooperate with a transfer lever 91 pivotally mounted on the bar 85. The lever 91 is provided with a bent-over ear which engages between the flanges of a spool 92 which is slidably and non-rotatably mounted on the square shaft 60 of the next higher order of the machine. Secured to the spool 92 is a tens-transfer gear 93 which normally lies out of the path of a single transfer tooth provided on a tens-transfer actuator disc 94 secured to the actuator shaft 70. However, when the accumulator dial 22 passes from "9" to "0" or from "0" to "9" the lever 91 will be rocked and thereby cause the transfer gear 93 in the next higher order to be moved into the plane of the actuator disc 94 where it will be operated by the single tooth thereon and so cause an additional increment of movement to be given to the next higher order accumulator dial.

The revolutions counter dials 23 are mounted on a series of horizontal dial shafts 100 which are journalled at their forward ends in a carriage frame bar 101 and at their rear ends in the bar 85. Also secured to each dial shaft 100 is an actuator gear 102 which is arranged to be driven by a counter actuator device 103 so as to cause the counter dial located in the number one position to be given one step of movement for each cycle of operation of the actuator shaft 70. This mechanism is fully shown and described in the above-mentioned Patent No. 2,229,889, and reference may be had to this patent for further information concerning the construction and mode of operation of this mechanism.

Each of the accumulator dial shafts 84 is provided with a mutilated resetting gear 108 which is arranged to cooperate with a resetting rack 109 mounted for endwise sliding movement in the bar 85. This rack is connected with the zero setting knob 27 (Fig. 1) so that reciprocation of the knob 27 will cause the rack 109 to likewise be reciprocated and thereby cause all of the numeral wheel dials 22 to be reset to their zero positions. The revolutions counter dials 23 may likewise be reset to zero by means of mutilated gears 110 secured to the dial shafts 100 and cooperating with a resetting rack 111 operatively connected with the resetting knob 28. Further information concerning the detailed construction of the resetting mechanism for the accumulator dials and revolutions counter dials may be obtained by referring to Patent No. 2,229,889 in which this mechanism is fully shown and described.

*Plus and minus keys*

Means is provided whereby the depression of the plus key 30 will cause the add gear 81 to be engaged with the gear 83 on the lower end of the dial shaft 84 and thereafter cause the driving motor of the machine to be energized and the main clutch to be engaged. Referring to Fig. 8 of the drawings, the plus key 30 is mounted on the upper end of a key stem 115 which is mounted for endwise sliding movement by means of slots 116 formed therein which engage with screws 117 mounted in a control plate 118. This plate is secured to the right side frame 46 and serves as a support for the right hand control mechanisms of the machine. The key stem 115 carries a roller 119 which is adapted to cooperate with a cam face 120 provided on a gate setting slide 121 which is pivotally attached at its rear end to an arm 122 secured to the shaft 83. This slide is supported at its forward end by means of an arm 123 pivotally connected to the slide by means of a stud 124 mounted in the upper end of the arm and pivoted at its lower end on a stud 125 mounted in the control plate 118. Hence, when the plus key 30 is depressed the slide 121 will be moved rearwardly and thereby cause the shaft 88 to be rocked clockwise as viewed in Fig. 2 and so cause the gear 81 to be engaged with the gear 83.

Also mounted on the key stem 115 is a stud 126 adapted to cooperate with an inclined slot 127 provided in a motor control slide 128 which is mounted for sliding movement on the screw 117 and on a similar screw 129. Lying against the rear end of the slide 128 is a pin 131 (see also Fig. 9) which is mounted in the upper end of a clutch control lever 132 pivotally supported on a screw 133 which is secured to the right side frame 46. The lower end of the lever 132 cooperates with a clutch dog 134 and normally holds the dog out of engagement with a driving ratchet (not shown) which is operatively connected to the gear 135 which is secured to a sleeve 136 (Fig. 8) journalled on the shaft 74. Meshing with the gear 135 is an idler gear 137 which is arranged to be driven by a spur gear 138 mounted on the end of the motor shaft 139.

Pivotally secured to the pin 131 is a link 140 which is pivoted at its opposite end on a stud 141 mounted in the upper end of a lever 142 which is pivotally supported on a screw 143. The lower end of the lever 142 is bifurcated and engages with a pin 144 provided on the upper end of a lever 145 pivotally supported on a screw 146. The lower end of the lever 145 carries an insulated roller 147 which is adapted to engage with one leaf of a leaf spring contact 148. Hence, when the stud 131 is moved rearwardly against the action of a spring 149 connected to the forward end of the link 140, the contacts 148 are closed and the driving motor is energized. This causes the gears 138, 137 and 135 to be rotated thereby causing the driving ratchet of the clutch to be revolved and, upon engagement of the dog 134 therewith, to cause the shaft 74 to which the dog is secured to be rotated and thereby cause operation of the actuator shafts 70. The square shafts 60 will hence be rotated to an extent depending upon the setting of the selector gears 59 and motion of this shaft will be transmitted to the accumulator dials 22 by means of the gears 81 and 83.

In a similar manner, depression of the minus key 31 will cause the subtract gears 82 to be engaged with the gears 83 mounted on the lower ends of the dial shafts 84 and so cause the amount set up on the numeral keys 29 to be subtracted from the setting of the accumulator dials 22. The key stem 130 of the minus key 31 is mounted for endwise sliding movement by means of elongated slots 154 therein which engage with the screw 129 and a similar screw 155. The key stem 130 is provided with a roller 156 which is adapted to cooperate with a cam face 157 provided on the gate setting slide 121. Therefore, depression of the minus key 31 will cause the slide 121 to be moved forwardly and so cause counter-clockwise rotation of the shaft 83, as viewed in Fig. 2, so as to cause the subtract gears 82 to be engaged with the gears 83. The key stem 130 also carries a stud 158 which cooperates with an inclined slot 159 provided in the motor control slide 128 so as to cause the motor to be energized and the clutch to be engaged when the minus key is depressed.

*Key release mechanism*

Referring now to Fig. 4 it will be observed that the key stems of each of the numeral keys 29 and the ordinal clear keys 32 are provided with elongated slots 170 through which are passed transverse through-rods 171 which are supported in the keyboard framework. The numeral keys from 1–9 in each bank are normally maintained in their raised positions by means of a coil spring 172 which is secured at either end to the front and back end plates 173 and 174 respectively (Fig. 3) of the keyboard framework. The ordinal clear keys 32 are resiliently maintained in their raised positions by means of compression springs 175 which lie within apertures provided in the plate 173 and are compressed between the bottom of the aperture and a lug 176 provided on the stem of each of the keys 32. Each of the numeral keys 29 is provided with an inclined cam face 177 which cooperates with a latching slide 178 so that when the key is depressed this slide will be moved rearwardly against the force of a compression spring 179 (Fig. 3) until the key is fully depressed, whereupon the slide will move forward into engagement with a notch 180 provided in the stem of each of the keys 29 thereby maintaining the keys in their depressed positions. Any of the numeral keys from 1–9 in each bank may be released by means of the ordinal clear key 32 for that bank. The key stem of each ordinal clear key is provided with an inclined cam face 181 which will cause the latching slide 178 to be moved rearwardly when this key is depressed to an extent sufficient to free any of the depressed numeral keys and allow them to be raised into their normal positions by means of the spring 172. Alternatively, any depressed numeral key may be released by the depression of another numeral key in the same bank. This release of one key by the depression of another in the same bank is made possible by a slight inclination of the key stem between the camming face 177 and the notch 180 which tends to provide a slight overthrow of the latching slide 178 so as to disengage the slide from the notch 180 of a previously depressed key.

The forward ends of the latching slides 178 are bent downwardly to form abutment faces 182 which are adapted to be engaged by a common key release bail 183 extending across the front of the machine between the side frames 45 and 46. This bail is pivotally mounted on a rod 184 supported at either end in the side frames. As shown in Fig. 9, the key release bail 183 is provided with a laterally extending projection 185 which passes through an aperture 186 provided in the right side frame 46. The bail 183 is adapted to be operated toward the end of each machine cycle by means of a finger 187 provided on the forward end of a link 188 pivotally supported on a stud 189 secured to a lever 190 pivoted at 191 on the right side frame. The link 188 and the lever 190 are urged toward the front of the machine by means of a spring 192 tensioned between a stud on the link 188 and a stud mounted on the right side frame. The lever 190 is provided with an extension 193 which is adapted to engage with a limit stop 194 mounted in the right side frame so as to limit the movement of the link 188 and the lever 190 under the influence of the spring 192.

The lever 190 is provided at its lower end with a pin 195 extending through an aperture 196 provided in the right side frame. In order to cause the lever 190 to be operated near the end of a machine cycle in order to release any depressed amount keys 29, a cam 200 (Fig. 5) is secured to the right hand face of a drum cam 201 secured to the transverse shaft 74. This cam is adapted to cooperate with a nose 202 provided on the lower end of a lever 203 pivotally mounted on a screw 204 secured to the right side frame 46. At its upper end the lever 203 is pivotally connected at 205 with the rear end of a link 206 which is provided at its forward end with a hook 207 for engaging with the stud 195. The forward end of the link 206 is also provided with an inclined cam face 208 which bears against a roller 209 mounted on the right side frame. The link 206 is also provided with an elongated slot 210 which cooperates with a pin 211 secured to the stem of the add key 34 (see also Fig. 9). The add key is normally held in its raised position by means of a spring 215 which is tensioned between pin 211 and a stud mounted on the right side frame. The key 34, however, may be latched down in its depressed position by means of a notch 216 formed in the edge of the key which cooperates with a square stud 217 secured to the right side frame. When the add key 34 is depressed, the hook 207 engages over the pin 195 and the lever 203 is rocked clockwise by a spring 218 so as to move the nose 202 into the path of the cam 200. Toward the end of the machine cycle, the cam 200 will engage with the nose 202 to rock the lever 203 counter-clockwise and pull the link 206 rearwardly to thereby rock the lever 190 counter-clockwise (Fig. 9) and thereby cause the link 188 to rock the key release bail 183 and thus release any depressed amount keys 29.

*Key-set - key-responsive mechanism*

In the machine, as hereinbefore described, the amount to be entered into the accumulator is set up on the keys 29 after which the plus key 30 or the minus key 31 is depressed so as to cause operation of the actuating mechanism and thereby cause the amount set on the keys to be entered positively or negatively into the accumulator wheels 22. In the present machine, however, means is also provided whereby the machine may be converted into a key-responsive type of calculating machine at the will of the operator. For this purpose a special key slide device 225 (Figs. 3 and 4) is provided beneath the key latching slide 178 for the units order bank of amount keys 29. As herein illustrated, this slide is in the form of a U-shaped channel and is supported beneath the keys by means of a pair of parallel links 226 which are pivotally secured at their lower ends to the slide 225 and at their upper ends to a longitudinally extending keyboard frame plate. The slide 225 is urged toward the front of the machine by means of a spring 224 and is provided with rectangular slots 227 through which the lower ends of the stems of the keys 29 extend so that when one of the keys 29 is depressed, the inclined cam face 177 thereon will engage with a lip 228 formed at the rear edge of each of the slots 227 and thereby cause the slide 225 to be moved toward the rear of the machine against the urgency of its spring 224. In a similar manner the inclined cam face 181 on the ordinal clear key 32 for the units order will engage with the rear end of a slot 229 provided in the forward end of the slide 225 so as to cause rearward movement of the slide.

Near its forward end the slide 225 is provided with a downwardly extending finger 230 which engages with a formed-over ear 231 (see Figs. 3, 5, and 6) provided on the upper end of an interponent 232 which is pivotally mounted on a frame stud 233 by means of an elongated slot 234 provided therein. The interponent 232 is normally urged upwardly by means of a spring 235 and at the same time is urged to rotate in a clockwise direction about the stud 233 so as to bring the forward edge of the interponent into engagement with the edge of the cross-bar 54. At its lower end the interponent carries a stud 237 which lies within a U-shaped recess provided in an intermediate latch 238 which is pivotally mounted on the stud 233 and urged clockwise by means of a spring 239. The lower edge of the intermediate latch 238 engages with a shoulder 240 formed on the forward end of a primary latch or pawl 241 pivotally mounted on a screw 242 which is secured to the right side frame 46. The latch 241 is urged to rotate in a clockwise direction about screw 242 by means of a spring 243 so as to cause an inclined face 244 provided on the latch nose to bear against a projection or stud 245 secured to an auxiliary power slide 246. The slide 246 is mounted for longitudinal sliding movement on the side frame of the machine by means of a pair of elongated slots 247 which cooperate with the stud 233 and a second stud 248. The slide is urged rearwardly by means of a relatively strong spring 249 so as to cause the primary latch 241 to be rocked counterclockwise when the latch 238 is released. Thus, when the latch 241 is held by the latch 238, the stud 245 and inclined face 244 restrain the slide 246 against the urge of the spring 249; but the stud 245 and inclined face 244 cooperate with the spring 249 to bias the latch device 241 to move to a non-restraining position with respect to the slide 246 when the latch device 238 is released. An operating hook projection 250 is secured to the slide 246 by means of screws 251 with provision being made for adjusting the hook backward or forward relative to the slide 246.

As shown more clearly in Fig. 8, the hook 250 is adapted to cooperate with a stud projection 255 mounted in the forward supporting arm 128 for the gate setting slide 121, sufficient clearance being provided between the hook 250 and the stud 255 when the parts are in their normal positions as to enable the gate setting slide 121 to be moved forwardly to its subtracting position without interference on the part of the hook 250 and the stud 255. The stud 255 also lies in front of an operating arm 256 for the motor control slide 128. The arm 256 is loosely pivoted on the stud 125 at its lower end and is provided with a bifurcation at its upper end which engages over a stud 257 secured to the slide 128. When the parts are in their normal positions as shown in Fig. 8, a clearance is provided between the stud 255 and the forward edge of the arm 256 so that when the power slide 246 is released and moved rearwardly by means of its spring 249 the hook 250 will first engage the stud 255 and initiate rearward movement of the gate setting slide 121 and, after a brief interval, will pick up the arm 256 and cause rearward movement of the motor control slide 128. Hence, the add gears 81 (Fig. 2) will be engaged with the gears 83 on the lower ends of the dial shafts 84 after which the motor will be energized and the clutch engaged so as to cause operation of the actuating mechanism. Thus, when an amount key 29 in the units order or the ordinal clear key 32 thereof is depressed, the special key slide 225 will be cammed rearwardly thus causing the interponent 232 to be rocked counter-clockwise against the tension of its spring 235. This will cause the stud 237 on the interponent to move forwardly and thus rock the intermediate latch 238 out of engagement with the shoulder 240 on the primary latch 241 thereby freeing the primary latch 241 to be rocked counterclockwise by pressure exerted by the spring 249 through the stud 245 of the slide 246 on the inclined face 244 of the latch 241. Such rocking of the latch 241 will free the power slide 246 for movement under the influence of its spring 249. As the slide 246 moves rearwardly, the stud 245 will rock the latch 241 counter-clockwise against the influence of its spring 243 as the stud rides up the inclined face 244. When the power slide 246 comes to rest in its rearward or operated position, the pin 245 will rest against a flat surface 258 provided on the latch 241 behind the inclined face 244.

On the rear end of the slide 246 is provided a stud 259 which bears against the forward edge of the lever 203 so that as the slide moves rearwardly the lever will be rocked clockwise about its pivot 204 and thereby cause the nose 202 on the lever to be moved into the path of the cam 200. Hence, when the machine is cycled, the cam will engage the nose 202 and force the slide 246 forward thereby permitting the latch 241 to be rocked clockwise by its spring 243 and thereby permit the latch 238 to again engage the shoulder 240 and thus retain the slide 246 in its forward position.

In order to prevent repeated operations of the slide 246 in the event that a key 29 in the units order is held depressed, the power slide 246 is provided on its forward end with an inclined camming surface 260 which is adapted to engage the pin 237 on the interponent 232 and force the same downward against the tension of its spring 235 thereby disengaging the ear 231 from the finger 230. This will permit the interponent to be rocked clockwise by its spring 235 until the forward edge thereof engages with the crossbar 54 so that the ear 231 will now lie beneath the point of the finger 230. The intermediate latch 238 will now be free to engage the shoulder 240 on the primary latch 241 when the power slide is restored at the conclusion of the machine cycle.

In order to transform the machine from a key-responsive type to a key-set type, manually settable means comprising a finger button 261 (Fig. 1) is provided at the front of the machine, this button having a shank 262 (Fig. 7) which projects through a slot 263 provided in the casing 264 of the machine. The inner end of the shank 262 is secured to a keeper plate 265 located beneath the casing 264, the keeper plate being provided with a formed-over ear 266 engaging with an inclined cam face 267 provided on the upper end of a strap 268. This strap is provided with a pair of formed-over ears 269 provided with apertures which engage over the rod 184 which serves to support the key release bail 183. The strap 268 is provided with a rearwardly extending portion 270 which lies over an ear 271 formed on the interponent 232. In case the operator wishes to render the units-order live key mechanism inoperative, the finger button 261 may be moved to the right (Fig. 1) thereby causing the strap 268 to be rocked counterclockwise (Fig. 5) so as to force the interponent 232 downwardly out of engagement with the finger 230 on the special key slide 225. Hence, although the slide 225 will be operated as previously described, each time that a key 29 in the units order is depressed the interponent 232 will not be rocked thereby and hence the power slide 246 will remain inactive. When the finger button 261 is again moved to the left (Fig. 1) the interponent 232 will be released by the extension 270 on the strap 268 so that ear 231 on the interponent will again lie behind the finger 230 as shown in Fig. 6 thereby rendering the live key mechanism for the units order operative to set the add-subtract gate and initiate a machine cycle whenever a key in the units order is depressed.

Since the live key mechanism hereinbefore described will ordinarily be used in adding operations, provision has been made for causing the add key 34 to be automatically latched down at the end of the first cycle of key-responsive operation. For this purpose the link 206 is provided at its forward end with an arcuate cam surface 275 so that when the link is moved forwardly by the power slide 246, the forward end of the link 206 will be moved downwardly as a result of the cooperation of the surface 275 with the roller 269. This downward movement is sufficient to enable the notch 216 in the add key to be engaged with the square stud 217 (Fig. 9) by the spring 215 (Fig. 5). Thus the hook 207 on the link 206 will be engaged with the pin 195 and when the link is again moved toward the rear of the machine by engagement of the cam 200 with the nose 202, the key release bail 183 will be operated to move the key latching slide 178 rearwardly and permit any depressed amount keys to be returned to their raised positions by means of their springs 172. The add key 34 will remain latched down so as to cause key release at the end of each machine cycle until the key is manually released by the operator.

In order to enable the present mechanism to be advantageously used in the case of numbers ending in a series of zeros, provision has been made for connecting each of the ordinal clear keys 32 (Fig. 1) with the release mechanism for the power slide 246. As shown in Figs. 3 and 4, a laterally extending bail 276 is provided beneath the forward edge of the amount keyboard, this bail being provided at either end with formed-over ears 277 by means of which the bail is pivoted on a rod 278 secured at either end to the right and left side frames of the machine. The bail 276 is provided along its upper edge with a formed-over portion 279 which is adapted to cooperate with the lower ends of the key stems of the ordinal clear keys 32. Hence, whenever one of these keys is depressed, the bail will be rocked clockwise about the rod 278 and thereby cause a finger 280 struck off from the bail to press rearwardly against a lug 281 provided on the forward end of the special key slide 225. As hereinbefore described, rearward movement of the slide 225 will cause the finger 230 to rock the interponent 232 and thereby release the power slide 246 for rearward movement under the influence of its spring 249. As shown in Fig. 1, each of the ordinal clear keys 32 is provided with a somewhat elongated key cap in order to facilitate the depression of these keys by the operator of the machine when entering a number ending in a series of zeros.

*Operation*

While it is believed that an understanding of the mode of operation of the present mechanism may be gathered from the foregoing description, a brief summary thereof will now be given in order to afford a more thorough understanding of this invention.

When it is desired to use the machine in adding up a list of figures, the finger button 261 is moved to the left as viewed in Fig. 1 so as to enable the ear 231 on the interponent to lie behind the finger 230 as shown in Fig. 6. The first figure of the series to be added is now set up on the amount keys 29 and if the last digit of the figure is a number from "1" to "9" the depression of the corresponding key in the units order will cause the special key slide 225 to be moved toward the rear of the machine thereby rocking the interponent 232 and releasing the intermediate latch 238 (Fig. 6) so as to free the primary latch 241 and permit the power slide 246 to be moved rearwardly by its spring 249 (Fig. 7). If the last digit of the amount to be added is a zero, or if the amount ends in a series of zeros, the operator may depress any one of the ordinal clear keys 32 to the right of the last significant digit thereby causing the bail 276 (Fig. 4) to be rocked clockwise and so cause the slide 225 to be moved rearwardly thereby releasing the latch 238 and the power slide 246 as before. During the rearward travel of the slide 246, the hook 250 thereon will pick up the stud 255 (Fig. 8) and cause the gate setting slide 121 to be moved rearwardly so as to engage the add gears 81 with the gears 83 on the lower ends of the dial shafts 84.

Following the engagement of the gears 81 with the gears 83, the motor switch 148 (Fig. 9) will be closed and the clutch control lever 132 will be disengaged from the clutch dog 134 so as to initiate a cycle of operation of the actuating mechanism of the machine. The closure of the switch and engagement of the clutch results from the rearward movement of the motor control slide 128 due to engagement of the stud 255 with the arm 256. At the same time, the stud 259 on the rear end of the power slide 246 (Fig. 5) will cause the lever 203 to be rocked clockwise thereby moving the nose 202 into the path of the cam 200 and also causing the hook 207 to be moved over the stud 195 and the add key 34 to be latched down. During cycling of the machine, the cam 200 will engage the nose 202 so as to restore the power slide 246 and permit the shoulder 240 (Fig. 6) on the primary latch 241 to be re-engaged by the intermediate latch 238. The link 206 will also be drawn rearwardly so as to cause operation of the key release bail 183 (Figs. 5 and 9). As hereinbefore described, the power slide 246 will be relatched in its home position even though one of the amount keys in the units order, or one of the ordinal clear keys 32, is held depressed by reason of the cooperation of the inclined cam face 260 on the forward end of the power slide 246 with the stud 237 secured to the interponent 232 which will cause the connection between the finger 230 and the ear 231 to be broken during the rearward travel of the power slide. When the power slide 246 is restored to its home position, the stud 255 (Fig. 8) will be released by the hook 250 so as to enable the add-subtract gears 81 and 82 (Fig. 2) to be returned to their neutral position, as shown in Fig. 2, by means of the conventional centralizing springs for the add-subtract gate 86. Similarly, when the arm 256 is released by the stud 255, the motor circuit will be broken and the clutch disengaged by spring 149 (Fig. 9) thereby terminating a cycle of operation of the calculating machine. The next number of the series to be added is now set up on the amount keyboard in the previously described manner, the machine again being cycled upon depression of a key 29 in the units order or by depression of one of the ordinal clear keys 32. After the last number of the series has been added into the accumulator wheels 22, the machine may be restored to normal—so as to enable multiplying or dividing operations to be performed thereon in the conventional manner—by moving the finger button 261 to the right so as to cause the interponent 232 (Fig. 6) to be forced downwardly thereby breaking the connection between the finger 230 and the ear 231. The machine will now be restored to its normal key-set condition and the add key 34 may be released by pulling forward thereon so as to remove the notch 216 (Fig. 9) from the square stud 217, whereupon the key will be elevated into its normal position by means of the spring 215 (Fig. 7).

Having thus described our invention, what we claim as new and desire to secure by Letters Patent is:

1. In a calculating machine of the class described having means for giving the machine cycles of operation and means for initiating operation of said cycling means; the combination of a keyboard having a plurality of orders of depressible amount keys each order of which comprises a plurality of keys; an amount registering means; a differential mechanism controlled by said amount keys for causing an amount to be entered into said registering means; and means for effecting, in a single cycle of said cycling means, entry in said registering means of a multi-digit value set in a plurality of orders of said keyboard, comprising a slide movable from one position to another for operating said initiating means; means for resiliently urging said slide to move from said one position to said other position; a primary latch device engageable with said slide for restraining said slide against movement under the influence of said urging means and being biased to move to a non-restraining position with respect to said slide and thus release said slide to be moved by said urging means; another latch device engageable with said primary latch device for retaining the latter in position for restraining said slide; and means including a displaceable element common to all of the keys of the lowest only of said orders of keys and operable by any one of said keys of said lowest order for disabling said other latch device and releasing said primary latch device and said slide for movement so as to cause operation of said initiating means.

2. In a calculating machine of the class described having means for giving the machine cycles of operation and means for initiating operation of said cycling means; the combination of a keyboard having a plurality of orders of depressible amount keys each order of which comprises a plurality of keys; an amount registering means; a differential mechanism controlled by said amount keys for causing an amount to be entered into said registering means; and means for effecting, in a single cycle of said cycling means, entry in said registering means of a multi-digit value set in a plurality of orders of said keyboard, comprising a slide movable from a normal position to an actuated position for operating said initiating means; means for urging said slide from said normal position to said actuated position; a primary latch device for restraining said slide against movement and being biased to move to a non-restraining position with respect to said slide and thus release said slide to be moved by said urging means; another latch device engageable with said primary latch device for retaining the latter in position for restraining said slide; a displaceable element; means on each of the keys of the lowest only of said orders of keys for causing said element to be displaced whenever a key in said lowest order is depressed; and means on said element cooperable with said other latch device so as to cause the latter to be disabled whenever the element is displaced and thereby enable the bias on said primary latch device to move it to discontinue the restraint on said slide and enable said slide to operate said initiating means.

3. In a calculating machine of the class described having means for giving the machine cycles of operation and means for initiating operation of said cycling means; the combination of a keyboard having a plurality of orders of depressible amount keys; a register; a differential mechanism controlled by said amount keys for causing an amount set up thereon to be entered into said register; a power operated actuator for operating said initiating means; means for restraining said actuator against operation including a rotatable pawl having a nose, an element on said actuator engageable by said pawl nose when said pawl is in its normal position for restraining said actuator and tending to rotate said pawl from its normal position to release said actuator for operation, and means for latching said pawl against rotation; and means rendered effective upon depression of any one of said amount keys for releasing said latch means and allowing said actuator to operate said initiating means.

4. In a calculating machine of the class described having means for giving the machine cycles of operation and means for initiating operation of said cycling means; the combination of a member movable from a normal position to an actuated position for operating said initiating means; means for urging said member to move from said normal position to said actuated position; a latch device for restraining said member against movement; a plurality of depressible amount keys; a slide device; means on each of said keys for causing said slide device to be operated whenever a key is depressed; means including an interponent operatively connecting said slide device with said latch device so as to cause the latter to be disabled whenever the slide device is operated; a manually settable means for selectively disconnecting said interponent from one of said devices and thereby preventing the disabling of said latch device and the release of said member whenever a key is depressed; and other means for effecting operation of said cycle initiating means when said manually settable device is set to disable said connecting means.

5. In a calculating machine of the class described having means for giving the machine cycles of operation and means for initiating operation of said cycling means; the combination of a spring-driven actuator for operating said initiating means; a latch mechanism for retaining said actuator in its home position; a plurality of depressible amount keys; a shiftable member; means on each of said keys for causing said member to be shifted whenever a key is depressed; an operative connection between said member and said latch mechanism for causing the latter to be released upon shifting of said member, said connections including a displaceable pivotally and slidably mounted interponent for connecting said member with said latch mechanism; a manually settable device for selectively slidably displacing said interponent so as to break the connection between said member and said latch mechanism and thereby prevent the release of said actuator upon depression of an amount key; and other means for effecting operation of said cycle initiating means when said manually settable device is set to disable said connecting means.

6. In a calculating machine of the class described having means for giving the machine cycles of operation and means for initiating operation of said cycling means; the combination of a spring-driven actuator for operating said initiating means; means for retaining said actuator in its home position, said means including a pivoted pawl having a nose, a projection on said actuator engageable with said nose for rotating said pawl when said actuator moves out of home position, and a latch for preventing rotation of said pawl; a plurality of depressible amount keys; a shiftable member; means on each of said keys for causing said member to be shifted whenever a key is depressed; an operative connection between said member and said latch for causing the latter to be released upon shifting of said member including a displaceable element for connecting said member with said latch; and a manually settable device for selectively displacing said element so as to break the connection between said member and said latch and thereby prevent release of the actuator upon depression of an amount key.

7. In a machine of the class described having a main operating mechanism, power means for giving said main operating mechanism cycles of operation, and means for initiating operation of said power means; the combination of a member movable from a normal position to an operated position; means for resiliently urging said member to move from said normal position to said operated position; means for causing said member to operate said initiating means when the member moves from its normal position to its operated position; means driven by said main operating mechanism for restoring said member from its operated position to its normal position on each cycle of operation; a latch mechanism for holding said member in its normal position against the influence of said urging means; a plurality of depressible amount keys; an operative connection between each of said keys and said latch mechanism for causing the latter to be released upon depression of any of said keys; and means operating in response to the movement of said member from its normal position to its operated position for breaking said connection so as to enable said member to be relatched in its normal position even though an amount key be held depressed.

8. In a machine of the class described having a plurality of depressible amount keys, an amount registering means, a differential actuating mechanism controlled by said amount keys for causing an amount to be entered into said registering means, power means for operating said differential actuating mechanism, and means for initiating operation of said power means; the combination of a power driven member movable from a normal position to an operated position for operating said initiating means; cyclically operable means associated with said differential actuating mechanism for restoring said power driven member from its operative position to its normal position; means for normally restraining said member against movement from said normal position to said operative position; an operative connection between each of said keys and said restraining means for causing the latter to be disabled upon depression of any of said keys; and means operated in response to movement of said power driven member from its normal position to its operative position for breaking said operative connection so as to enable said restraining means to again become effective to restrain said power driven member when it is restored to its normal position even though an amount key be held depressed.

9. In a machine of the class described having a main operating mechanism, power means for giving said main operating mechanism cycles of operation, and means for initiating operation of said power means; the combination of a slide movable from a normal position to an operated position; means for resiliently urging said slide to move from said normal position to said operated position; means for causing said slide to operate said initiating means when the slide moves from its normal position to its operated position; a latch device for holding said slide in its normal position against the influence of said urging means; a plurality of depressible amount keys; a control member connected with each of said keys and also with said latch device for causing said device to be released when one of said keys is depressed; means driven by said main operating mechanism for restoring said slide to its normal position on each cycle of operation; and means on said slide for causing the connection between said control member and said latch device to be broken when said slide moves from its normal position to its operated position so as to enable said slide to be relatched when restored by said main operating mechanism so as to prevent repeated cycling of the machine in case an amount key is held depressed.

10. In a machine of the class described having a main operating mechanism, power means for giving said main operating mechanism cycles of operation, and means for initiating operation of said power means; the combination of a spring-driven actuator for operating said initiating means; cyclically operable means associated with said main operating mechanism for returning said actuator to its home position; a latching means for retaining said actuator in its home position; a plurality of depressible amount keys; a member common to all of said keys and adapted to be shifted when any one of them is depressed; an operative connection between said member and said latching means for causing the latter to be released upon shifting of said member including a displaceable element for connecting said member with said latching means; and means operating in response to the movement of said actuator when the same is released by said latching means for displacing said element so as to break the connection between said member and said latching means and thereby enable the actuator to be relatched when returned to its home position even though an amount key be held depressed.

11. In a machine of the class described having a main operating mechanism, power means for giving said main operating mechanism cycles of operation, and means for initiating operation of said power means; the combination of a spring-driven actuator for operating said initiating means; cyclically operable means associated with said main operating mechanism for returning said actuator to its home position; means for retaining said actuator in its home position, said means including a pivoted pawl, a projection on said actuator for rotating said pawl when said actuator moves out of home position, and a latch for preventing rotation of said pawl; a plurality of depressible amount keys; a member common to all of said keys and adapted to be shifted when any one of them is depressed; an operative connection between said member and said latch for causing the latter to be released upon shifting of said member including a displaceable element for connecting said member with said latch; and means operating in response to the movement of said actuator when the same is released for displacing said element so as to break the connection between said member and said latch and cause the actuator to be retained when returned to its home position even though an amount key be held depressed.

12. In a calculating machine of the class described having means for giving the machine cycles of operation and means for initiating operation of said cycling means; the combination of a keyboard having a plurality of orders of depressible amount keys including a units order; a non-denominational key in each of said orders; a register; a differential mechanism controlled by said amount keys for causing an amount set up thereon to be entered into said register; a normally idle power-operated device for operating said initiating means; a displaceable member common to all of the keys in said units order; means on each of the keys in said units order for causing said member to be displaced whenever a key in that order is depressed; means controlled by each of said non-denominational keys for causing said member to be displaced; and means for causing said power operated device to be operated whenever said member is displaced to thereby cause a machine cycle.

13. In a calculating machine of the class described having means for giving the machine cycles of operation and means for initiating operation of said cycling means; the combination of a keyboard having a plurality of orders of depressible amount keys including a units order; a non-denominational key in each of said orders; a register; a differential mechanism controlled by said amount keys for causing an amount set up thereon to be entered into said register; a member movable from a normal position to an operated position; means for resiliently urging said member to move from said normal position to said operated position; means for causing said member to operate said initiating means when said member moves from its normal position to its operated position; a latch device for holding said member in its normal position against the influence of said urging means; a displaceable element common to all of the keys in said units order; means on each of the keys in said units order for causing said element to be displaced whenever a key in that order is depressed; connections between said non-denominational keys and said element for causing said element to be displaced whenever one of the latter keys is depressed; and a connection between said element and said latch device for causing said device to be released whenever said element is displaced to thereby enable said member to operate said initiating means and cause cycling of the machine.

14. In a calculating machine of the class described having means for giving the machine cycles of operation and means for initiating operation of said cycling means; the combination of a keyboard having a plurality of orders of depressible amount keys including a units order; means for retaining the keys in their depressed position; a non-denominational key in each of said orders cooperating with said retaining means for releasing any depressed key in that order; a register; a differential mechanism controlled by said amount keys for causing an amount set up thereon to be entered into said register; a normally idle, power-operated device for operating said initiating means; a displaceable member common to all of the keys in said units order; means on each of the keys in said units order for causing said member to be displaced whenever a key in that order is depressed; connections between said non-denominational keys and said member for causing the latter to be displaced whenever one of the latter keys is depressed; a latch device for preventing operation of said power operated device, a connection between said member and said latch device for causing the latter to be disabled whenever the member is displaced by the depression of a units order key or a non-denominational key so as to enable said power-operated device to operate said initiating means and cause cycling of the machine; and a manipulative member for breaking said connection so as to prevent disabling of said latch whenever a units order key or a non-denominational key is depressed.

15. In a calculating machine of the class described having means for giving the machine cycles of operation and means for initiating operation of said cycling means; the combination of a plurality of depressible amount keys; means for retaining said keys in their depressed positions; a normally idle power device for operating said initiating means; means controlled by said amount keys for causing said power device to operate said initiating means; normally ineffective means for disabling said key retaining means near the end of each machine cycle; and means operated by said power device for rendering said last-recited means effective to disable said retaining means for the amount keys.

16. In a machine of the class described having a main operating mechanism, power means for giving said mechanism cycles of operation, and means for initiating operation of said power means; the combination of a plurality of depressible amount keys; means for retaining said keys in their depressed positions; a power operated member movable from a normal position to an operative position for operating said initiating means; means for normally restraining said member against movement from said normal position to said operative position; means controlled by said amount keys for disabling said restraining means so as to allow said power driven member to operate said initiating means; normally inoperative means driven by said main operating mechanism for disabling said key retaining means during the latter part of each cycle; and means on said power driven member for conditioning said normally inoperative means for operation as said member moves from its normal position to its operative position to thereby cause said retaining means to be disabled and said keys to be released during the latter part of the cycle.

17. In a machine of the class described having a main operating mechanism, power means for driving said main operating mechanism, and means for initiating operation of said power means; the combination of a plurality of depressible amount keys; means for retaining said keys in their depressed positions; a normally idle power device for operating said initiating means; a latch device for restraining said power device against operation, means controlled by said amount keys for releasing said device and permitting said power device to operate said initiating means; normally inoperative means for disabling said key retaining means near the end of each machine cycle; means operated by said power device for conditioning said last-mentioned means for operation; and means driven by said main operating mechanism for operating said disabling means and for simultaneously restoring said power device to its latched position.

18. In a calculating machine of the class described having means for giving the machine cycles of operation and means for initiating operation of said cycling means; the combination of a plurality of depressible amount keys; means for retaining said keys in their depressed positions; a normally idle power device for operating said initiating means; means controlled by said amount keys for causing said power device to operate said initiating means; normally inactive means for disabling said key retaining means near the end of each machine cycle, said means having an inactive position and an active position; a manipulative latch member for enabling said disabling means to be manually moved to its active position and held there; means operated by said power device for moving said disabling means to its active position where it will be held by said latch member; and means driven by said main operating means for operating said disabling means when the latter is in its active position to thereby effect release of the amount keys near the end of the machine cycle.

19. In a machine of the class described having a register, a plurality of amount entering devices into which a numerical value may be set, a differential actuating mechanism controlled by said amount entering devices for effecting entry into said register of a value set into said devices, a sign determining device settable to either of two positions for determining whether the value shall be entered additively or subtractively into said register, and power means for operating said differential actuating mechanism; the combination of means for initiating operation of said power means; a manipulative member for setting said sign determining device to one of said positions and for operating said initiating means in a predetermined sequence; a power device for setting said sign determining device to one of said positions and for operating said initiating means in a predetermined sequence; means for normally restraining said power device from operation; a mechanical linkage for operatively connecting said amount entering devices with said restraining means so as to cause said latter means to be disabled when a value is set into said devices and thereby enable said power device to set said sign determining device and operate said initiating means; and selectively operable means for disabling said linkage so as to prevent said restraining means from being disabled when a value is set into said amount entering devices thereby placing the operation of said initiating means and said sign determining device solely under the control of said manipulative member.

20. In a calculating machine of the class described having a register, a plurality of amount entering devices into which a numerical value may be set, a differential actuating mechanism controlled by said amount entering devices for effecting entry into said register of a value set into said devices, a sign determining mechanism adjustable from a neutral position to either an add or a subtract position for controlling the sign of the entry into said register, power means for operating said differential actuating mechanism, and means for initiating operation of said power means; the combination of a power operated member movable from a normal position to an operated position; a projection on said sign determining mechanism; a projection on said power operated member adapted to pick-up the projection on said sign determining mechanism as the member moves from its normal position to its operated position and adjust said mechanism to its add position, there being sufficient clearance provided between said projections when the sign determining mechanism is in its neutral position and the power operated member is in its normal position to permit said sign determining mechanism to be adjusted to its subtract position without any interference from the projection on said power operated member; and means cooperating with the projection on said power operated member for operating said initiating means after said sign determining mechanism has been adjusted to its add position.

GEORGE W. HOPKINS.
DONALD L. ROLPH.

References Cited in the file of this patent

UNITED STATES PATENTS

| Number | Name | Date |
|---|---|---|
| 1,136,725 | Shiek | Apr. 20, 1915 |
| 1,432,616 | Phinney | Oct. 17, 1922 |
| 1,637,827 | Kottmann | Aug. 2, 1927 |
| 1,668,531 | Schmidt | May 1, 1928 |
| 1,849,169 | Britten | Mar. 15, 1932 |
| 2,096,465 | Overbury | Oct. 19, 1937 |
| 2,117,620 | Mathi | May 17, 1938 |
| 2,152,199 | Machado | Mar. 28, 1939 |
| 2,311,354 | Friden | Feb. 16, 1943 |
| 2,391,089 | Friden et al. | Dec. 18, 1945 |
| 2,401,473 | Friden | June 4, 1946 |
| 2,527,467 | Turck | Oct. 24, 1950 |
| 2,531,207 | Gang | Nov. 21, 1950 |
| 2,552,789 | Hopkins | May 15, 1951 |